Patented Dec. 2, 1952

2,620,272

UNITED STATES PATENT OFFICE 2,620,272

VARIABLE CONTRAST PHOTOGRAPHIC MATERIAL AND PROCESS OF PREPARING IT

George Schwarz, Rochester, N. Y., assignor, by mesne assignments, to Bell & Howell Company, Chicago, Ill., a corporation of Illinois No Drawing. Application May 12, 1947, Serial No. 747,590

9 Claims. (Cl. 95—7)

The present invention relates to a photographic material having variable contrast properties, and to the method of manufacturing the same. It is applicable to both photographic film and photographic paper.

The prior proposals for obtaining variable contrast in photographic emulsions may be conveniently divided into three main classes. In the first of these, two separate emulsions are used, having different gradations or degrees of contrast, and at least one of the emulsions is optically sensitized to a spectral region to which the other emulsion is relatively insensitive. In the second class, a single emulsion is used, naturally sensitive to one spectral region, and the entire emulsion is optically sensitized, to a minor or incomplete extent only, to a different spectral region, the emulsion working "hard" or with high contrast when exposed to light in the spectral region of natural sensitivity and working "soft" or with low contrast when exposed to light in the spectral region of optical sensitivity. In the third class, a single emulsion is used and is divided into two parts, a minor part being optically sensitized to an extent approaching complete or maximum sensitization, in a spectral region differing from the spectral region of natural sensitivity, and the remainder or major part of the emulsion having only its natural sensitivity or being optically sensitized to a spectral region differing from that to which the minor part of the emulsion is sensitive. When the major and minor parts are blended and coated on a base or support, the emulsion works hard when exposed to light in the spectral region to which the major part is sensitive and works soft when exposed to light in the spectral region to which the minor part is sensitive.

All of these prior proposals have disadvantages of one kind or another.

An object of the present invention is the provision of an improved and more satisfactory photographic material having variable contrast properties, and an improved and more satisfactory method of manufacturing such material.

Another object of the invention is the provision of variable contrast photographic material which has greater reliability and flexibility in use than the variable contrast materials heretofore known.

Still another object of the invention is the provision of a variable contrast photographic material which has improved characteristic curves as compared with the characteristic curves of the prior material.

A further object is the provision of an improved variable contrast photographic material which can be manufactured relatively easily and inexpensively.

According to the present invention, only a single emulsion is used, as distinguished from the prior proposals of the first class above mentioned, and this emulsion is divided into at least three parts and preferably more than three parts, all but one of the divided parts being optically sensitized to different extents, as distinguished from the prior proposals of the second and third classes above mentioned. It may be said that the emulsion is divided, according to the present invention, into a series of parts, the word "series" being herein intended to mean three or more.

The emulsion used should be one which has relatively high contrast, in its natural state. It is divided into a series of approximately equal parts or portions, and one of these parts or portions is usually left in its natural state (that is, without being optically sensitized) while another part or portion is optically sensitized to a different spectral region from the natural sensitivity of the emulsion, the optical sensitization being to an extent approaching complete or maximum sensitization. The other part or parts of the series into which the emulsion is divided, is or are optically sensitized to various partial extents intermediate between zero sensitization and complete or maximum sensitization. The parts of the emulsion after being separately sensitized as above mentioned, are then mixed or blended together and are coated as a single coating on film, paper, or other suitable supporting material.

The result is that the emulsion, when exposed to light in the spectral region of natural sensitivity of the emulsion, will work hard or give relatively high contrast, producing the maximum contrast of which the emulsion is capable. When the emulsion is exposed to light only in the spectral region to which the part of the emulsion has been optically sensitized, it will work soft or give relatively low contrast. When exposed to light in both spectral regions, it will give intermediate degrees of contrast depending on the relative proportions of light in the spectral region of natural sensitivity and in the spectral region of optical sensitivity. The response of the emulsion, particularly to mixed light in both spectral regions, is extremely good and is notably superior to the response obtained from variable contrast emulsions of the prior art, particularly in the ability to secure smooth gradations of contrast by varying the proportions of light in the two spectral regions, without abrupt jumps or gaps between successive available gradations of contrast. The characteristic curves of the material when exposed to light in the different spectral regions or mixtures of such light, are considerably improved over the characteristic curves of the emulsions of the prior art.

According to a variation of the invention, the entire body of the emulsion may be optically sensitized to improve its response to, for example, the blue region of the spectrum, and in addition to this general sensitization of the entire emulsion, the various parts of the emulsion may be differentially sensitized to another spectral region, as above set forth. Also it is within the scope of the invention to use a plurality of different sensitizing dyes in differentially sensitizing the various parts of the emulsion.

Any silver halide photographic emulsion may be used according to the present invention. It should, however, have relatively high contrast. The known silver chloride emulsions have, as a class, high contrast, and may be used. A silver bromide emulsion of the high contrast type may also be used, or a silver chloro-bromide emulsion may be used.

While the emulsion may be divided, for purposes of differential optical sensitization, into the series of only three parts, it is preferred to divide it into at least five parts and preferably about six or seven parts, for differential optical sensitization as above mentioned.

Any known optical sensitizing dye may be used, which will sensitize to a spectral region for which a light source is conveniently available and which region is reasonably removed from the spectral region of natural sensitivity of the particular emulsion employed. Many such optical sensitizing dyes are well known in the art. Many of the most suitable dyes are dyes of the cyanine type, but other dyes may also be used according to the invention.

As examples of the cyanine dyes which may be employed, there may be mentioned the following:

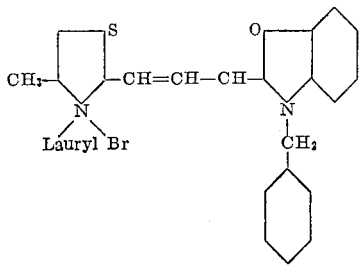
(1)

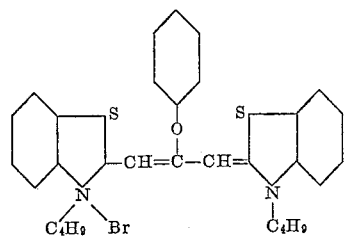
(2)

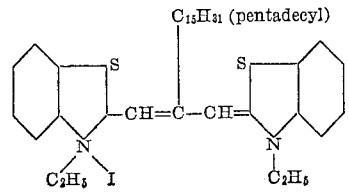
(3)

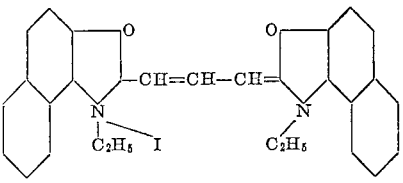
(4)

Among the dyes other than cyanine dyes, which may be used according to the present invention, are the following:

The merocyanines, as for example:

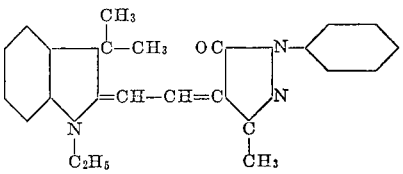
(5)

Erythrosine (6)

Erythrosine esters (7)

A group of dyes obtainable by condensing a ring containing —CH$_2$—CO— with aromatic aldehydes, as for example:

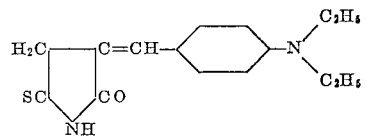
(8)

The pinaflavois, as for example:

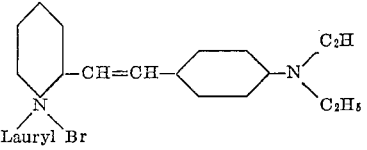
(9)

The dye used to impart optical sensitivity should be one which is relatively diffusion-proof and does not wander or migrate from the dyed grains to the undyed or less dyed grains of the emulsion. The dyes given above as examples are all quite satisfactory, and give good results according to the present invention. It is within the scope of the present invention to use two or more different dyes in the same blend, either in the same part of the emulsion or in different parts thereof. The ratio of the different parts or portions of the emulsion may, of course, be varied within reasonable limits, although it is usually preferred to divide the emulsion into several equal or substantially equal parts, and to leave one part part undyed; to dye another part with the quantity of dye necessary to impart substantially the maximum optical sensitivity which can be imparted to the particular emulsion employed by the particular dye employed; to dye another part of the emulsion with approximately one-half of the amount of dye necessary to impart maximum sensitivity; to dye another part of the emulsion with approximately one-quarter of the amount necessary to impart maximum sensitivity; and so on, each successive part of the emulsion being dyed with roughly about one-half of the concentration of dye used in the previous part.

A few specific examples will be given. They are not to be taken as limitations upon the invention, but rather as illustrative embodiments, since the generic principles of the invention may be carried out in many specific ways.

Example 1

A high contrast bromide emulsion is divided into six approximately equal parts. One of these parts is not optically sensitized, but the others are progressively or differentially optically sensitized by the use of the dye mentioned in the above Formula 1. It is found that a concentration of this dye of approximately 20 milligrams per liter of the emulsion is maximum optical sensitization to this particular emulsion in the spectral region of about 546 m$\mu$. One of the six parts into which the emulsion is divided is, accordingly, sensitized by this dye to the extent of 20 milligrams of the dye per liter of the emulsion, thus giving substantially maximum optical sensitivity to this one part of the emulsion. Another part of the emulsion is sensitized by ten milligrams of the dye per liter of the emulsion; the third part is sensitized by five milligrams of the dye per liter of the emulsion; the fourth part is sensitized by two milligrams of the dye per liter of the emulsion; the fifth part is sensitized by one milligram of the dye per liter of the emulsion; and the sixth part of the emulsion is not optically sensitized at all, as above mentioned. Then the six parts of the emulsion are blended and mixed together, and coated as usual on the film base or paper base.

This emulsion is particularly suitable for use with mercury vapor lamps, the lines between 3663 Å. and 4359 Å. giving high contrast, and the line at 5461 Å. giving low contrast.

Example 2

A silver chloride emulsion of high contrast is divided into eight parts, of approximately equal volume. One part is sensitized by the use of the dye in preceding Formula 1, to the extent of 20 milligrams of the dye per liter of the emulsion. A second part of the emulsion is sensitized by the same dye to the extent of 10 milligrams per liter. A third part is sensitized to the extent of 8 milligrams per liter. A fourth part of the emulsion is sensitized by the same dye to the extent of 5 milligrams of dye per liter of emulsion. The other four parts of the emulsion are left unsensitized. Then the eight parts of the emulsion are mixed and blended together, and coated as usual on the film base or paper base. This emulsion, like the one given in preceding Example 1, is particularly suitable for use with a mercury vapor printing light.

Example 3

A fine grain bromide emulsion of a low iodide content, such as is frequently used for making reproductions of line drawings and the like, is divided into five substantially equal parts and is sensitized with the dye mentioned in foregoing Formula 3, as follows: One part of the five parts into which the emulsion is divided is sensitized to the extent of 30 milligrams of dye per liter of emulsion. A second part is sensitized by the same dye to the extent of 15 milligrams of dye per liter of the emulsion. The third part is sensitized to the extent of 6 milligrams per liter; the fourth part is sensitized to the extent of 2 milligrams per liter; and the fifth part is not sensitized. Then the five parts of the emulsion are mixed and blended together and coated as usual on the film base or paper base.

This results in a variable contrast photographic material which is particularly suitable for reproduction work, as for example in the photomechanical reproduction arts. The material, when exposed without a filter or with a blue or magenta filter, gives excellent results in reproduction of line drawings and the like. When exposed through a yellow filter, it gives excellent results in half tone reproductions. When exposed through an orange filter or through a light red filter, still a further reduction of contrast is obtained, all without destroying the substantially straight line characteristics of the sensitometric curve of the photographic material.

Example 4

The whole volume of a silver chloride emulsion of high contrast is sensitized for blue with benzothiocyanine to the extent of 15 milligrams thereof per liter of the emulsion. The entire emulsion is then divided into eight equal parts, and sensitized in the same manner as in preceding Example 2. In other words, the material in this present example is the same as in Example 2 except that the entire emulsion is sensitized for blue by the use of benzothiocyanine, in addition to the differential sensitization mentioned in Example 2.

Example 5

A silver bromide emulsion of high contrast is divided into ten approximately equal parts. Two different sensitizing dyes are used, one being the dye mentioned in foregoing Formula 1, and the other being the dye mentioned in foregoing Formula 5. Of the ten parts into which the emulsion is divided, one part is sensitized by the use of the dye of Formula 1 to the extent of 20 milligrams of dye per liter of emulsion; another part is sensitized to the extent of 5 milligrams of the same dye per liter of the emulsion; a third part is sensitized to the extent of 1 milligram of the same dye per liter of the emulsion. A fourth part of the emulsion is sensitized by 10 milligrams of the dye of Formula 5 per liter of the emulsion; a fifth part is sensitized by 2 milligrams of the dye of Formula 5 per liter of the emulsion. The remaining five parts of the emulsion are not sensitized. As before, the various parts of the emulsion are mixed and blended together, and coated as usual on the film base or paper base.

As is well understood in the art, the natural sensitivity of the silver halide emulsions mentioned in the foregoing examples (that is, when they are not optically sensitized) under practical conditions is in the general spectral regions of approximately 350 to 430 m$\mu$ in the case of silver chloride emulsions, and approximately 350 to 500 m$\mu$ in the case of silver bromide emulsions or bromo-iodide emulsions of relatively low iodine content. All of the optical sensitizing dyes mentioned in the foregoing Formulas 1 to 9 have the effect of sensitizing these emulsions in spectral regions of materially longer wave lengths than those just mentioned. While there is some variation between the different dyes mentioned, most of them (when used in optimum amounts) produce a good degree of sensitivity in the spectral region of approximately 540 to 555 m$\mu$. Thus when the emulsion of the present invention is exposed to light in the shorter wave length regions above mentioned, it will work hard or give relatively high contrast, while when it is exposed to light of longer wave length (for example, in the region of approximately 540 to 550 m$\mu$) it will work soft or give relatively low contrast under the same conditions of development. Various mixtures of light between these wave lengths will produce intermediate degrees of contrast in a very satisfactory manner.

The use of an "over-all" sensitizer for sensitizing the whole volume of the emulsion to the blue region, as in foregoing Example 4, has the advantage, particularly with a silver chloride emulsion, of slightly extending the wave length of light which may be used effectively for high contrast printing.

What is claimed is:

1. The process of preparing light-sensitive photographic material capable of producing images of different contrast under the same conditions of development, comprising dividing a batch of photographic silver halide emulsion into a series of at least three parts of approximately equal volume, optically sensitizing to differential extents a plurality of said parts but less than all of said parts by mixing with each of said plurality of parts a quantity of substantially the same sensitizing dye capable of producing optical sensitization of the emulsion to light in a spectral region differing from the spectral region of natural sensitivity of the emulsion, different quantities of dye being mixed with different parts of said batch, leaving at least one of said parts free of any substantial quantity of said dye used in differentially sensitizing said plurality of parts, blending all of the parts of the batch with each other, and coating the blended batch on a support.

2. The process according to claim 1, in which the plurality of parts differentially sensitized comprises more than half of the number of parts into which the batch is divided.

3. The process according to claim 1, in which the plurality of parts differentially sensitized comprises all but one of the number of parts into which the batch is divided.

4. The process of preparing light-sensitive photographic material capable of producing images of different contrast under the same conditions of development, comprising dividing a batch of photographic silver halide emulsion into a series of at least three parts of approximately equal volume, optically sensitizing one of said parts by mixing therewith a sensitizing dye effective to produce optical sensitization of the emulsion in a spectral region of materially longer wave length than the spectral region of natural sensitivity of emulsion, in a quantity sufficient to produce substantially the maximum sensitization obtainable with the particular sensitizing dye employed, optically sensitizing a second one of said parts to a materially lesser degree of sensitization by mixing therewith such a sensitizing dye in a quantity of not more than one-half the quantity needed to obtain maximum sensitization, optically sensitizing a third one of said parts to a still lesser degree of sensitization by mixing therewith such a sensitizing dye in a quantity of not more than one-fourth the quantity needed to obtain maximum sensitization, mixing the entire series of parts of the batch with each other, and coating the mixed batch on a support.

5. The process according to claim 4, in which all of said sensitized parts of the emulsion are sensitized by the same sensitizing dye.

6. The process according to claim 4, in which certain of said plurality of sensitized parts of the emulsion are sensitized with one sensitizing dye and in which the others of said plurality of sensitized parts of the emulsion are sensitized with another sensitizing dye.

7. The process according to claim 4, in which the entire batch of the emulsion is optically sensitized to a substantially uniform extent by mixing therewith a sensitizing dye effective to produce optical sensitization of the emulsion in a spectral region of shorter wave length than the spectral region to which said plurality of parts are differentially sensitized.

8. The process according to claim 7, in which the differential sensitization to said longer wave length is produced by one or more of the cyanine dyes, and in which the uniform sensitization to said shorter wave length is produced by benzothiocyanine.

9. The product of the process of claim 4.

GEORGE SCHWARZ.

REFERENCES CITED

The following references are of record in the file of this patent:

UNITED STATES PATENTS

| Number | Name | Date |
|---|---|---|
| 1,980,941 | Mannes et al. | Nov. 13, 1934 |
| 2,280,300 | Potter et al. | Apr. 21, 1942 |
| 2,384,593 | Carroll | Sept. 11, 1945 |

FOREIGN PATENTS

| Number | Country | Date |
|---|---|---|
| 552,363 | Great Britain | Apr. 5, 1943 |
| 808,762 | France | Nov. 24, 1936 |